UNITED STATES PATENT OFFICE.

CHARLES A. BRYANT, OF CLANTON, ALABAMA.

COMPOUND FOR DESTROYING BOLL-WEEVILS.

1,253,932.

Specification of Letters Patent. Patented Jan. 15, 1918.

No Drawing. Application filed March 14, 1916. Serial No. 84,218.

*To all whom it may concern:*

Be it known that I, CHARLES A. BRYANT, a citizen of the United States, residing at Clanton, in the county of Chilton and State of Alabama, have invented new and useful Improvements in Compounds for Destroying Boll-Weevils, of which the following is a specification.

This invention relates to compounds especially adapted to be used for destroying boll weevil and similar insects and it consists in the novel features hereinafter described and claimed.

An object of the invention is to provide a compound of the nature stated which is composed of ingredients brought together and which mutually coöperate with each other to effect the destruction of boll weevil and similar insects when the same is applied by spraying or otherwise to the plants upon which the said insects usually live or thrive.

With this object in view the compound includes four principal ingredients. The following is a formula of the compound.

To a suitable quantity of astyptodyne which is a proprietary medicine containing an antiseptic styptic anodyne add an amount of Sloan's liniment also a proprietary medicine and which contains turpentine and to this add a quantity of kerosene oil to which finally add a quantity of spirits of turpentine. After these ingredients are thoroughly mixed the compound is in condition for application to the plants and may be applied by spraying or otherwise. Upon application of the compound to the plants it will be found that boll weevil and similar insect life is destroyed and thus the said plants are relieved of damage usually caused by such insects.

The mixture is compounded substantially in the following proportion; astyptodyne one-fourth of a gill, liquid measure, Sloan's liniment one-fourth of a gill, liquid measure, spirits of turpentine one-half gill, liquid measure and kerosene oil, one gallon, liquid measure.

Having described the invention what is claimed is:—

A compound for destroying boll weevil and the like comprising astyptodyne, Sloan's liniment, kerosene oil and spirits of turpentine mixed substantially in the proportions stated for application to plants by spraying or otherwise.

In testimony whereof I affix my signature in presence of two witnesses.

CHARLES A. X BRYANT.
his mark

Witnesses:
E. B. DEASON,
T. S. PYRON.